United States Patent [19]

Oetiker

[11] Patent Number: 4,991,266
[45] Date of Patent: Feb. 12, 1991

[54] MECHANICAL INTERLOCK FOR OPEN CLAMP STRUCTURES

[75] Inventor: Hans Oetiker, Horgen, Switzerland

[73] Assignee: Hans Oetiker AG Maschinen- und Apparatefabrik, Horgen, Switzerland

[21] Appl. No.: 942,695

[22] Filed: Dec. 17, 1986

[51] Int. Cl.⁵ .............................................. F16L 33/02
[52] U.S. Cl. .................................. 24/20 R; 24/20 CW
[58] Field of Search ............. 24/20 R, 20 EE, 20 TT, 24/20 W, 20 LW, 16 PB

[56] References Cited

U.S. PATENT DOCUMENTS

| | | | |
|---|---|---|---|
| 1,687,854 | 10/1928 | Anderson | 24/20 EE |
| 1,851,733 | 3/1932 | Shapiro | 24/20 EE X |
| 2,970,359 | 2/1961 | Dryden | 24/16 PB X |
| 3,501,814 | 3/1970 | Anderson et al. | 24/16 PB |
| 4,299,012 | 11/1981 | Oetiker | 24/20 CW X |
| 4,442,154 | 4/1984 | Fortsch et al. | 24/20 R X |
| 4,492,004 | 1/1985 | Oetiker | 24/20 R |
| 4,517,708 | 5/1985 | Calmettes et al. | 24/20 CW |
| 4,581,792 | 4/1986 | Spier | 24/20 EE X |
| 4,622,720 | 11/1986 | Oetiker | 24/20 EE X |

FOREIGN PATENT DOCUMENTS 1013380 12/1965 United Kingdom ............. 24/20 EE

Primary Examiner—James R. Brittain
Attorney, Agent, or Firm—Paul M. Craig, Jr.

[57] ABSTRACT

A mechanical interlock for an open clamp structure which includes a clamping band having an outer band portion and an inner band portion, intended to overlap in the closed condition of the clamp structure. The inner band portion is provided in the area near its end at least with an outwardly extending combined guide and support hook whose inclined guide and support surface is formed by its rear edge facing away from the free end of the inner band portion; the rear edge forming the guide and support surface is thereby non-rectilinear, as viewed in the axial direction of the clamp structure, to facilitate assembly of the clamp structure and minimize down-time of the machine for punching out the clamp structure. To further improve its holding ability, the rear edge includes a widened portion at least near the area where the outer band portion comes to lie when the clamp is installed on an object to be fastened.

18 Claims, 1 Drawing Sheet

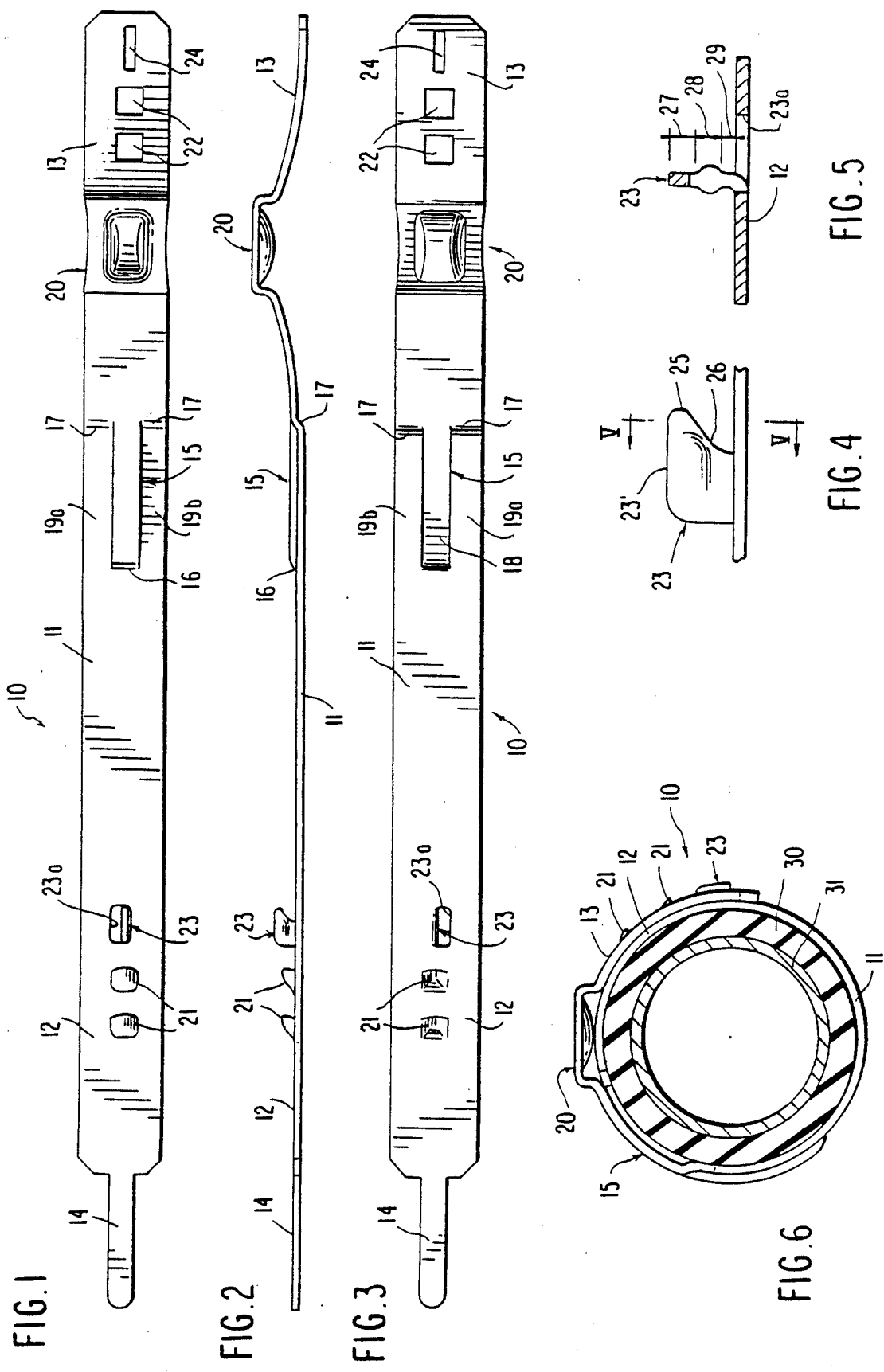

MECHANICAL INTERLOCK FOR OPEN CLAMP STRUCTURES

BACKGROUND OF THE INVENTION

The present invention relates to a mechanical connection for open clamp structures, and more particularly to a mechanical connection which incudes a combined guide and support hook near the end of the inner band portion adapted to engage in a complementary aperture provided near the end in the outer band portion.

PRIOR ART

Open clamp structures adapted to be interconnected by the use of one or more outwardly extending hooks engaging in corresponding apertures in the outer band portion are known in the prior art. For example, my prior U.S. Pat. No. 3,082,498 (FIG. 4) and the U.S. Pat. No. 3,321,811 to Thomas utilize outwardly extending hooks in the form of punched-out, tab-like members which were intended to provide both a guide and support function. However, these types of prior art clamp structures were unable to assure a sufficient holding ability during contraction of a so-called "Oetiker" ear when installing the clamp as the quite significant circumferential forces tended to cause the tab-like hook members to be bent back, thereby resulting in opening of the clamp. The problem becomes the more severe the thinner the used band material. For that reason, clamp structures with two such tab-like hooks were already proposed in my prior U.S. Pat. Nos. 3,475,793 and 3,523,337. However, as all of these prior art hooks were in the form of more or less rectangular tab-like members bent out of the band material after an initial, approximately U-shaped cut with the connection of the tab-like member with band material extending along a line transverse to the longitudinal direction of the clamp structure, a completely satisfactory holding of the clamp structure could not be attained even if, for example, two hooks were used with an arrangement as disclosed in the aforementioned U.S. Pat. No. 3,321,811.

My prior U.S. Pat. No. 4,299,012 disclosed a clamp structure in which the mechanical interlock was achieved by a tab-like member as used before and serving as guide hook in conjunction with one or more cold-deformed support hooks. In this prior art arrangement, the circumferentially directed forces were intended to be absorbed by the cold-deformed support hooks after the inner and outer band portions were guided toward one another by the guide hook during the tightening of the clamp structure. The arrangement disclosed in this patent provided a significant improvement over the pre-existing mechanical interlocks.

A further improvement of a mechanical interlock is disclosed in my prior U.S. Pat. No. 4,492,004 in which a guide hook as disclosed in my U.S. Pat. No. 4,299,012 was replaced by a hook member intended to perform both guide and support functions so that significant circumferentially directed forces could be absorbed already by the combined guide and support hook during the initial tightening of the clamp while the combined guide and support hook guides the overlying outer band portion toward the inner band portion. FIGS. 11 and 12 of my prior U.S. Pat. No. 4,492,004 show a guide and support hook 212 of tab-like configuration, pressed out of the band material and extending generally in the circumferential direction, and provided with a rectilinear guide surface formed by the rear edge of the tab-like member facing away from the free end of the inner band portion, whereby this guide surface was of rectilinear configuration and formed an acute angle with the top surface of the tab-like member.

SUMMARY OF THE INVENTION

It is the object of the present invention to provide a mechanical interlock of the type disclosed in my prior U.S. Pat. No. 4,492,004 which further increases the holding ability of the combined guide and support hook while at the same time facilitating assembly of the clamp and reducing the down time of the punching dies due to wear and tear thereof in operation.

The underlying problems are solved according to the present invention in that the combined guide and support hook which is preferably formed by a tab-like member punched out of the band material and extending in the circumferential direction of the clamp structure, includes an inclined guide and support surface formed by the rear edge thereof facing away from the free end of the inner band portion which is non-rectilinear, as viewed in the axial direction of the clamp structure in side view thereof.

According to another feature of the present invention, the non-rectilinear rear edge thereby passes over into the top surface of the combined guide and support hook by way of a rounded-off convexly curved portion, as viewed in side view. This not only facilitates elimination of a sharp corner, thereby reducing the down time of the machine by lengthening the useful life of the punching dies before having to replace worn punching dies, but also facilitates installation of the clamp as the edge of the complementary aperture in the outer band portion can now easily follow around the rounded-off contour when the clamp is tightened. The rounded-off, convexly curved portion is thereby followed by a concavely curved portion as viewed in side view which additionally contributes to the guide and support function of the mechanical interlock. In a preferred embodiment of the present invention, the radii of curvature of the convexly curved portion are generally smaller than the radii of curvature of the concavely curved portion.

According to still another feature of the present invention, the inclined guide and support surface formed by the rear edge is wider at least in the center area thereof as viewed in end view on the rear edge than in the area of the rounded-off convexly curved portion at the rear top of the inclined guide and support surface. This feature further contributes to the holding ability of the mechanical interlock and in particular to the ability of the combined guide and support hook to absorb considerable circumferentially directed forces because the force per unit area is reduced thereby. In a preferred embodiment of the present invention, the inclined guide and support surface formed by the rear edge includes, as viewed in end view on the rear edge, a first section having a first width that encompasses the area of the convexly-curved, rounded-off portion which is followed by a second section having a second width greater than the first width which, in turn, is followed by a third section of a width the same as the first section. The first section is thereby longer than the third section as viewed in end view on the rear edge while the second section, as viewed in end view on the rear edge, has an approximately curvilinear bulging configuration along both sides thereof. According to still another feature of the present invention, the area of greatest width in the second section is located at least near the area of the rear edge most closely approaching the free end of the inner band portion so that in the at least nearly installed condition of the clamp structure, the force per unit area in the rear edge, produced by the circumferentially directed forces is reduced.

According to still another feature of the present invention, the free end of the inner band portion may include a tongue-like extension adapted to engage in a tongue-receiving means of the type disclosed in my U.S. Pat. No. 4,299,012 or U.S. Pat. No. 4,315,348.

The mechanical interlock according to the present invention is both applicable to clamp structures provided with one or more so-called "Oetiker" ears as also to earless clamp structures as disclosed in my prior U.S. Pat. No. 4,492,004 or to clamp structures provided with threaded tightening means as disclosed in my U.S. Pat. No. 4,521,940.

BRIEF DESCRIPTION OF THE DRAWING

These and other objects, features and advantages of the present invention, will become more apparent from the following description when taken in connection with the accompanying drawing which shows, for purposes of illustration only, one embodiment in accordance with the present invention, and wherein:

FIG. 1 is a top plan view on a clamp structure in accordance with the present invention in the flat punched-out condition thereof;

FIG. 2 is a side elevational view of the clamp structure of FIG. 1;

FIG. 3 is a bottom plan view on the clamp structure of FIGS. 1 and 2;

FIG. 4 is a partial side elevational view, on an enlarged scale, illustrating contours of the combined guide and support hook in accordance with the present invention;

FIG. 5 is a cross-sectional view, taken along line V—V of FIG. 4; and

FIG. 6 is a transverse cross-sectional view through a hose installed on a nipple by the use of a clamp structure in accordance with the present invention.

DETAILED DESCRIPTION

Referring now to the drawing wherein like reference numerals are used throughout the various views to designate like parts, the clamp structure generally designated by reference numeral 10 includes a clamping band 11 having an inner band portion 12 and an outer band portion 13. The inner band portion 12 terminates in a tongue-like extension 14 intended to engage in a tongue-receiving channel generally designated by reference numeral 15 which is formed by two steps 16 and 17 following one another in the direction toward the free end of the outer band portion. The step 16 thereby forms the beginning of the channel-like indentation 18 while the non-indented lateral band portions 19a and 19b follow the outward displacement of the indentation 18 in the steps 17. The channel-like indentation 18 may thereby also be formed by several interrupted longitudinal cuts leaving therebetween relatively short web sections which connect the remaining side portions 19a and 19b with the channel 18 as disclosed in my prior U.S. Pat. No. 4,299,012. In the alternative, the tongue-receiving means may also be formed by an aperture combined with the steps as disclosed in my prior U.S. Pat. No. 4,315,348.

If the clamp is to be tightened, this may be achieved by any known means, for example, by a so-called "Oetiker" ear generally designated by reference numeral 20 which is located intermediate the tongue-receiving means 15 and the outer band portion 13 and which may be of any conventional construction as disclosed, for example, in any of the aforementioned patents or in my copending application Ser. No. 922,408, filed Oct. 23, 1986, the subject matter of which is incorporated herein by reference.

The mechanical interlock includes one or more cold-deformed support hooks 21 of the type disclosed in my prior U.S. Pat. No. 4,299,012 which extend outwardly from the inner band portion 12 and are adapted to engage in substantially square apertures 22. Additionally, the mechanical interlock in accordance with the present invention includes a tab-like member generally designated by reference numeral 23 which is punched-out of the band material and extends in the longitudinal direction of the clamping band. The tab-like combined guide and support hook 23 is thereby of at least generally rectangular configuration, as viewed in side view of the clamp structure, leaving a generally rectangular opening 23a where punched-out and bent-up from the band 11. The combined guide and support hook 23 includes a guide and support surface formed by the rear edge thereof facing away from the free end of the inner band portion. However, contrary to the rectilinear guide and support surface as shown in FIGS. 11 and 12 of my prior U.S. Pat. No. 4,492,004, the guide and support surface formed by the rear edge of the tab-like combined guide and support hook 23 is non-rectilinear and includes a rounded-off convexly curved portion 25 (FIG. 4) which is followed in the radially inward direction by a concavely curved surface 26. As a result thereof, the rear edge of the combined guide and support hook 23 passes over into the top surface 23' thereof by the rounded-off portion 25 whose radii of curvature are generally smaller than the radii of curvature of the concavely curved portion 26 (FIG. 4). As can be seen in particular from FIG. 5, the inclined guide and support surface formed by the rear edge is thereby wider at least in the center area, as viewed in end view on the rear edge, than in the area of the convexly curved portion. The wider section is thereby defined by an at least approximately curvilinear configuration on both sides thereof which are convexly curved. In a preferred embodiment according to the present invention, the rear edge as viewed in end view in the circumferential direction, consists of a first section 27 (FIG. 5) of a width corresponding to the thickness of the band material, followed by a second section 28 of greater width which in turn is followed by a third section 29 again having a thickness substantially corresponding to the thickness of the band material. Furthermore, the area of greatest width in the second section is preferably located at least near the area of the rear edge forming the combined guide and support surface which approaches most closely the free end of the inner band portion so that the force per unit area in the combined guide and support hook can be reduced in the installed position of the clamp.

FIG. 6 illustrates a typical clamp structure in accordance with the present invention used for clamping a hose 30 onto a nipple 31.

The greater holding ability of the combined guide and support hook not only reduces the down time of the punching tool for repairing or exchanging the punching dies, but also facilitates assembly of the clamp over an object to be fastened in addition to a further improved ability on the part of the combined guide and support hook to withstand circumferentially directed forces, both during the installation of the clamp and in the installed condition of the clamp. The improved characteristics of the combined guide and support hook make it also possible to utilize only a single cold-deformed support hook and in some instances will obviate the need for a cold-deformed support hook when the circumferentially directed forces can all be absorbed reliably by the combined guide and support hook.

The dash lines in FIG. 4 indicated some alternate possible configuration of the convexly curved portion 26.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A mechanical connection for an open clamp structure which includes a metal clamping band having an outer band portion and an inner band portion, intended to mutually overlap in the closed condition of the clamp structure, the inner band portion being provided in the area near its end at least with an outwardly extending combined guide and support hook means punched-out of the inner band portion with inclined guide and support surface means formed by its rear edge facing away from the free end of the inner band portion and adapted to engage in a complementary aperture means provided in the outer band portion in the area near its end so as to guide the two band portions toward one another when closing the clamp structure and absorb circumferentially directed forces during the closing operation, characterized in that the rear edge forming the inclined guide and support surface means is non-reticular with a concavely curved portion adjoined rearwardly thereof by a convexly curved portion, as viewed in the axial direction of the clamp structure in side view thereof, so that the service life of the punching die used in punching-out the combined guide and support hook means is lengthened and the assembly of the clamp structure on an object to be fastened thereby is facilitated.

2. A clamp structure according to claim 1, characterized in that the non-rectilinear rear edge passes over into the top surface of the outwardly extending combined guide and support hook means by way of the rounded-off, convexly-curved portion as viewed in side view.

3. A clamp structure according to claim 2, characterized in that the radii of curvature of the convexly-curved portion are generally smaller than the radii of curvature of the concavely-curved portion.

4. A clamp structure according to claim 3, characterized in that the inclined guide and support surface means formed by said rear edge is wider at least in the center area thereof as viewed in end view on the rear edge in the circumferential direction of the clamp structure than in the area of the rounded-off, convexly-curved portion to increase the holding ability.

5. A clamp structure according to claim 4, characterized in that, as viewed in end view on the rear edge in the circumferential direction of the clamp structure, the inclined guide and support surface means formed by said rear edge includes a first section having a first width including the area of the rounded-off portion followed by a second section having a second width greater than said first width which, in turn, is followed by a third section of a width substantially similar to said first width.

6. A clamp structure according to claim 5, characterized in that said first section is longer than said third section, as viewed in end view on the rear edge in the circumferential direction of the clamp structure.

7. A clamp structure according to claim 6, characterized in that said second section is of convexly-curved configuration on both sides thereof, as viewed in end view on the rear edge in the circumferential direction.

8. A clamp structure according to claim 7, characterized in that the area of greatest width in said second section is located at least near the area of the rear edge most closely approaching the free end of the inner band portion.

9. A clamp structure according to claim 8, characterized in that the free end of the inner portion is in the form of a tongue-like extension adapted to engage in a circumferentially extending tongue-receiving means provided in the outer band portion to provide a substantially gap-free, stepless contour over the entire inner surface of the clamp structure.

10. A clamp structure according to claim 9, characterized in that the tongue-receiving means is formed by two steps in the outer band portion with one of the two steps being located in the center area of the clamping band in the direction toward the free end of the outer band portion followed by a step in the outer areas of the clamping band.

11. A clamp structure according to claim 10, characterized by a plastically deformable ear in the outer band portion between the second step and the free end thereof.

12. A clamp structure according to claim 1, characterized in that the combined guide and support hook means is a tab-like member of at least part rectangular shape which is punched and bent out of the clamping band and whose rear edge is non-rectilinear.

13. A clamp structure according to claim 12, characterized in that the non-rectilinear rear edge passes over into the top surface of the outwardly extending combined guide and support hook means by way of the rounded-off, convexly-curved portion as viewed in side view.

14. A clamp structure according to claim 1, characterized in that the inclined guide and support surface means formed by said rear edge is wider at least in the center area thereof as viewed in end view on the rear edge in the circumferential direction of the clamp structure than in the radially outer area thereof to increase the holding ability.

15. A clamp structure according to claim 14, characterized in that, as viewed in end view on the rear edge in the circumferential direction of the clamp structure, the inclined guide and support surface means formed by said rear edge includes a first section having a first width in the radially outer area thereof followed by a second section having a second width greater than said first width which, in turn, is followed radially inwardly thereof by a third section of a width substantially similar to said first width.

16. A clamp structure according to claim 15, characterized in that said first section is longer than said third section, as viewed in end view on the rear edge in the circumferential direction of the clamp structure.

17. A clamp structure according to claim 15, characterized in that said second section is of approximately curvilinear configuration on both sides thereof, as viewed in end view on the rear edge in the circumferential direction.

18. A clamp structure according to claim 14, characterized in that the area of greatest width in said second section is located at least near the area of the rear edge most closely approaching the free end of the inner band portion.

* * * * *